United States Patent [19]

Sery

[11] 4,358,849
[45] Nov. 9, 1982

[54] METHOD OF CHECKING VALIDITY OF CODED ALPHA/NUMERIC SIGNALS WITH A DATA PROCESSOR AND A MEMORY

[75] Inventor: Jacques Sery, Vitry sur Seine, France

[73] Assignee: Compagnie Internationale Pour l'Informatique Cii Honeywell Bull, Paris, France

[21] Appl. No.: 93,433

[22] Filed: Nov. 13, 1979

Related U.S. Application Data

[63] Continuation of Ser. No. 883,932, Mar. 6, 1978, abandoned.

[30] Foreign Application Priority Data

Mar. 4, 1977 [FR] France ............................. 77 06484

[51] Int. Cl.³ .............................................. G06F 11/10
[52] U.S. Cl. ...................................................... 371/53
[58] Field of Search ........................................... 371/53

[56] References Cited

U.S. PATENT DOCUMENTS

| 3,303,463 | 2/1967 | Hamburgen | 371/53 |
| 3,571,581 | 3/1971 | Kaus | 371/53 |
| 3,778,765 | 12/1973 | Kanter | 371/53 |
| 3,913,067 | 10/1975 | Goldberg | 371/53 |
| 4,065,752 | 12/1977 | Goldberg | 371/53 |

OTHER PUBLICATIONS

Richards, *Arithmetic Operations in Digital Computers*, D. Van Nostrand Co., Inc., 1955, pp. 250-251.

Primary Examiner—David H. Malzahn
Attorney, Agent, or Firm—Lowe, King, Price & Becker

[57] ABSTRACT

The validity of a code, such as an alpha-numeric code, constituted by a series of elements and including a checking key corresponding to the digit value of the first element of the code, is checked by a memory including an addressable dual-input table having a number of rows at least equal to the maximum number of elements of the code and a number of columns at least equal to all the possible numerical values of the code element. Columns and rows of the table are respectively addressed by the numerical value of a code element and by the relative position of the code elements in the code. The location defined by the intersection of the addressed column and row contains an entry for a remainder resulting from division by a given modulus of the numerical value of the code element multiplied by a coefficient assigned to the position. Each element of the code and the corresponding remainder contained in the location of the memory addressed by the code element are read by a processing means. The processing means adds the read remainder to a previous remainder and divides the sum of the addition operation by the modulus to obtain a new remainder. The checking key associated with each code is stored in the first row of the table. The checking key or first remainder are such that the final remainder obtained for the last element of the code is equal to zero when the code is correctly read.

9 Claims, 5 Drawing Figures

Fig. 2
TABLE 1

|    | 0 | 1 | 2 | 3 | 4 | 5 | 6 | 7 | 8 | 9 | 0 | 0 | 0 | 0 | 0 | 0 |
|----|---|---|---|---|---|---|---|---|---|---|---|---|---|---|---|---|
| 0  | 0 | 1 | 2 | 3 | 4 | 5 | 6 | 7 | 8 | 9 | 0 | 0 | 0 | 0 | 0 | 0 |
| 1  | 0 | 2 | 4 | 6 | 8 | 0 | 2 | 4 | 6 | 8 | 0 | 0 | 0 | 0 | 0 | 0 |
| 2  | 0 | 1 | 2 | 3 | 4 | 5 | 6 | 7 | 8 | 9 | 0 | 0 | 0 | 0 | 0 | 0 |
| 3  | 0 | 2 | 4 | 6 | 8 | 0 | 2 | 4 | 6 | 8 | 0 | 0 | 0 | 0 | 0 | 0 |
| 4  | 0 | 1 | 2 | 3 | 4 | 5 | 6 | 7 | 8 | 9 | 0 | 0 | 0 | 0 | 0 | 0 |
| 5  | 0 | 2 | 4 | 6 | 8 | 0 | 2 | 4 | 6 | 8 | 0 | 0 | 0 | 0 | 0 | 0 |
| 6  | 0 | 1 | 2 | 3 | 4 | 5 | 6 | 7 | 8 | 9 | 0 | 0 | 0 | 0 | 0 | 0 |
| 7  | 0 | 2 | 4 | 6 | 8 | 0 | 2 | 4 | 6 | 8 | 0 | 0 | 0 | 0 | 0 | 0 |
| 8  | 0 | 1 | 2 | 3 | 4 | 5 | 6 | 7 | 8 | 9 | 0 | 0 | 0 | 0 | 0 | 0 |
| 9  | 0 | 2 | 4 | 6 | 8 | 0 | 2 | 4 | 6 | 8 | 0 | 0 | 0 | 0 | 0 | 0 |
| 10 | 0 | 1 | 2 | 3 | 4 | 5 | 6 | 7 | 8 | 9 | 0 | 0 | 0 | 0 | 0 | 0 |
| 11 | 0 | 2 | 4 | 6 | 8 | 0 | 2 | 4 | 6 | 8 | 0 | 0 | 0 | 0 | 0 | 0 |
| 12 | 0 | 1 | 2 | 3 | 4 | 5 | 6 | 7 | 8 | 9 | 0 | 0 | 0 | 0 | 0 | 0 |
| 13 | 0 | 2 | 4 | 6 | 8 | 0 | 2 | 4 | 6 | 8 | 0 | 0 | 0 | 0 | 0 | 0 |
| 14 | 0 | 1 | 2 | 3 | 4 | 5 | 6 | 7 | 8 | 9 | 0 | 0 | 0 | 0 | 0 | 0 |
| 15 | 0 | 2 | 4 | 6 | 8 | 0 | 2 | 4 | 6 | 8 | 0 | 0 | 0 | 0 | 0 | FF |

Fig. 3
TABLE 2

|    | 0 | 1  | 2  | 3  | 4  | 5  | 6 | 7  | 8  | 9 | 0 | 0 | 0 | 0 | 0 | 0 |
|----|---|----|----|----|----|----|---|----|----|---|---|---|---|---|---|---|
| 0  | 0 | 1  | 2  | 3  | 4  | 5  | 6 | 7  | 8  | 9 | 0 | 0 | 0 | 0 | 0 | 0 |
| 1  | 0 | 2  | 4  | 6  | 8  | 10 | 1 | 3  | 5  | 7 | 0 | 0 | 0 | 0 | 0 | 0 |
| 2  | 0 | 3  | 6  | 9  | 1  | 4  | 7 | 10 | 2  | 5 | 0 | 0 | 0 | 0 | 0 | 0 |
| 3  | 0 | 4  | 8  | 1  | 5  | 9  | 2 | 6  | 10 | 3 | 0 | 0 | 0 | 0 | 0 | 0 |
| 4  | 0 | 5  | 10 | 4  | 9  | 3  | 8 | 2  | 7  | 1 | 0 | 0 | 0 | 0 | 0 | 0 |
| 5  | 0 | 6  | 1  | 7  | 2  | 8  | 3 | 9  | 4  | 4 | 0 | 0 | 0 | 0 | 0 | 0 |
| 6  | 0 | 7  | 3  | 10 | 6  | 2  | 9 | 5  | 1  | 8 | 0 | 0 | 0 | 0 | 0 | 0 |
| 7  | 0 | 8  | 5  | 2  | 10 | 7  | 4 | 1  | 9  | 6 | 0 | 0 | 0 | 0 | 0 | 0 |
| 8  | 0 | 9  | 7  | 5  | 3  | 1  | 10| 8  | 6  | 4 | 0 | 0 | 0 | 0 | 0 | 0 |
| 9  | 0 | 10 | 9  | 8  | 7  | 6  | 5 | 4  | 3  | 2 | 0 | 0 | 0 | 0 | 0 | 0 |
| 10 | 0 | 0  | 0  | 0  | 0  | 0  | 0 | 0  | 0  | 0 | 0 | 0 | 0 | 0 | 0 | 0 |
| 11 | 0 | 1  | 2  | 3  | 4  | 5  | 6 | 7  | 8  | 9 | 0 | 0 | 0 | 0 | 0 | 0 |
| 12 | 0 | 2  | 4  | 6  | 8  | 10 | 1 | 3  | 5  | 7 | 0 | 0 | 0 | 0 | 0 | 0 |
| 13 | 0 | 3  | 6  | 9  | 1  | 4  | 7 | 10 | 2  | 5 | 0 | 0 | 0 | 0 | 0 | 0 |
| 14 | 0 | 4  | 8  | 1  | 5  | 9  | 2 | 6  | 10 | 3 | 0 | 0 | 0 | 0 | 0 | 0 |
| 15 | 0 | 5  | 10 | 4  | 9  | 3  | 8 | 2  | 7  | 1 | 0 | 0 | 0 | 0 | 0 | FF |

Fig.4
TABLE 3

|    | 0 | 1  | 2  | 3  | 4  | 5  | 6  | 7  | 8  | 9  | 0 | 0 | 0 | 0 | 0 | 0  |
|----|---|----|----|----|----|----|----|----|----|----|---|---|---|---|---|----|
| 0  | 0 | 1  | 2  | 3  | 4  | 5  | 6  | 7  | 8  | 9  | 0 | 0 | 0 | 0 | 0 | 0  |
| 1  | 0 | 2  | 4  | 6  | 8  | 10 | 1  | 3  | 5  | 7  | 0 | 0 | 0 | 0 | 0 | 0  |
| 2  | 0 | 4  | 8  | 1  | 5  | 9  | 2  | 6  | 10 | 3  | 0 | 0 | 0 | 0 | 0 | 0  |
| 3  | 0 | 8  | 5  | 2  | 10 | 7  | 4  | 1  | 9  | 6  | 0 | 0 | 0 | 0 | 0 | 0  |
| 4  | 0 | 5  | 10 | 4  | 9  | 3  | 8  | 2  | 7  | 1  | 0 | 0 | 0 | 0 | 0 | 0  |
| 5  | 0 | 10 | 9  | 8  | 7  | 6  | 5  | 4  | 3  | 2  | 0 | 0 | 0 | 0 | 0 | 0  |
| 6  | 0 | 9  | 7  | 5  | 3  | 1  | 10 | 8  | 6  | 4  | 0 | 0 | 0 | 0 | 0 | 0  |
| 7  | 0 | 7  | 3  | 10 | 6  | 2  | 9  | 5  | 1  | 8  | 0 | 0 | 0 | 0 | 0 | 0  |
| 8  | 0 | 3  | 6  | 9  | 1  | 4  | 7  | 10 | 2  | 5  | 0 | 0 | 0 | 0 | 0 | 0  |
| 9  | 0 | 6  | 1  | 7  | 2  | 8  | 3  | 9  | 4  | 10 | 0 | 0 | 0 | 0 | 0 | 0  |
| 10 | 0 | 1  | 2  | 3  | 4  | 5  | 6  | 7  | 8  | 9  | 0 | 0 | 0 | 0 | 0 | 0  |
| 11 | 0 | 2  | 4  | 6  | 8  | 10 | 1  | 3  | 5  | 7  | 0 | 0 | 0 | 0 | 0 | 0  |
| 12 | 0 | 4  | 8  | 1  | 5  | 9  | 2  | 6  | 10 | 3  | 0 | 0 | 0 | 0 | 0 | 0  |
| 13 | 0 | 8  | 5  | 2  | 10 | 7  | 4  | 1  | 9  | 6  | 0 | 0 | 0 | 0 | 0 | 0  |
| 14 | 0 | 5  | 10 | 4  | 9  | 3  | 8  | 2  | 7  | 1  | 0 | 0 | 0 | 0 | 0 | 0  |
| 15 | 0 | 10 | 9  | 8  | 7  | 6  | 5  | 4  | 3  | 2  | 0 | 0 | 0 | 0 | 0 | FF |

Fig.5
TABLE 4

|    | 0 | 1  | 2  | 3  | 4  | 5  | 6  | 7  | 8  | 9  | 0 | 0 | 0 | 0 | 0 | 0  |
|----|---|----|----|----|----|----|----|----|----|----|---|---|---|---|---|----|
| 0  | 0 | 1  | 2  | 3  | 4  | 5  | 6  | 7  | 8  | 9  | 0 | 0 | 0 | 0 | 0 | 0  |
| 1  | 0 | 10 | 3  | 13 | 6  | 16 | 9  | 2  | 12 | 5  | 0 | 0 | 0 | 0 | 0 | 0  |
| 2  | 0 | 15 | 13 | 11 | 9  | 7  | 5  | 3  | 1  | 16 | 0 | 0 | 0 | 0 | 0 | 0  |
| 3  | 0 | 14 | 11 | 8  | 5  | 2  | 16 | 13 | 10 | 7  | 0 | 0 | 0 | 0 | 0 | 0  |
| 4  | 0 | 4  | 8  | 12 | 16 | 3  | 7  | 11 | 15 | 2  | 0 | 0 | 0 | 0 | 0 | 0  |
| 5  | 0 | 6  | 12 | 1  | 7  | 13 | 2  | 8  | 14 | 3  | 0 | 0 | 0 | 0 | 0 | 0  |
| 6  | 0 | 9  | 1  | 10 | 2  | 11 | 3  | 12 | 4  | 13 | 0 | 0 | 0 | 0 | 0 | 0  |
| 7  | 0 | 5  | 10 | 15 | 3  | 8  | 13 | 1  | 6  | 11 | 0 | 0 | 0 | 0 | 0 | 0  |
| 8  | 0 | 16 | 15 | 14 | 13 | 12 | 11 | 10 | 9  | 8  | 0 | 0 | 0 | 0 | 0 | 0  |
| 9  | 0 | 7  | 14 | 4  | 11 | 1  | 8  | 15 | 5  | 12 | 0 | 0 | 0 | 0 | 0 | 0  |
| 10 | 0 | 2  | 4  | 6  | 8  | 10 | 12 | 14 | 16 | 1  | 0 | 0 | 0 | 0 | 0 | 0  |
| 11 | 0 | 3  | 6  | 9  | 12 | 15 | 1  | 4  | 7  | 10 | 0 | 0 | 0 | 0 | 0 | 0  |
| 12 | 0 | 13 | 9  | 5  | 1  | 14 | 10 | 6  | 2  | 15 | 0 | 0 | 0 | 0 | 0 | 0  |
| 13 | 0 | 11 | 5  | 16 | 10 | 4  | 15 | 9  | 3  | 14 | 0 | 0 | 0 | 0 | 0 | 0  |
| 14 | 0 | 8  | 16 | 7  | 15 | 6  | 14 | 5  | 13 | 4  | 0 | 0 | 0 | 0 | 0 | 0  |
| 15 | 0 | 12 | 7  | 2  | 14 | 9  | 4  | 16 | 11 | 6  | 0 | 0 | 0 | 0 | 0 | FF |

METHOD OF CHECKING VALIDITY OF CODED ALPHA/NUMERIC SIGNALS WITH A DATA PROCESSOR AND A MEMORY

This is a continuation of application Ser. No. 883,932, filed Mar. 6, 1978, now abandoned.

FIELD OF THE INVENTION

The present invention relates to methods of and apparatus for checking the validity of a machine (such as a peripheral member of a data processing installation) reading a code written "in clear" on a document, such as a check carrying a line of markings printed in magnetic characters.

BACKGROUND OF THE INVENTION

The growth of banking operations has resulted in a considerable increase in the number of checks in circulation and in an increase in the written work necessary for accounting purposes; an example of the written work is up-dating of customers' accounts. It has therefore become necessary to automate a number of the check processing operations, such as sorting, bank and customer code checking, debit noting, as well as calculating and recording of appropriate credit in the account of each customer.

This automation was made possible by the use of checks which, in addition to the normal kind of writing, also carry magentic writing made up of characters which can be read both by the human eye and by machines. Typically, the magnetic characters are coded in seven lines, known by the abbreviated name of CMC 7, as described, inter alia, in approved French Standard NFK 11 of January 1968. The characters appear at the bottom of a check in the form of a band of markings occupying the entire length of the check. The characters are divided into three parts which contain codes relating respectively to the check circulation, the drawer identity and the check amount.

By automatically reading the codes carried in this band of markings, processing systems are able to perform a certain number of oeprations, amongst which are (a) check sorting, as determined by the account on which the check is drawn; (b) allocating the amount specified to the account designated; (c) keeping the bank account books and the customer accounts, and so on. It is clear that accuracy must be observed in such operations. Accuracy depends chiefly on correctly reading the codes which determine these operations; it is therefore essential to check each code read by the system, so as to remove any risk of error, and for the code to be validated before the check is handled by the processing system.

For this purpose, it is known to associate with each code a checking key which bears an unequivocal relationship to the nature, value and relative disposition of the elements making up the code. This key may be explicit, that is, it may be formed by a figure or number which is calculated as a function of the composition of any given code which is added, for example, to the end of the code. The key could equally well be implicit when all the codes are so composed as to satisfy a predetermined law, for example, the sum or product of the code components being equal to or divisible by a predetermined number.

A particularly convenient and widely used type of checking key is known as a "transposition check digit", or TCD for short. In the TCD, the check digit is derived by multiplying each of the numerical values of the elements making up the code by a coefficient which depends on the relative position in the code of the element concerned. These multiplied values are added together and divided by a given numer or modulus. The remainder of the division operation is determined and complemented to the modulus. If the code has been correctly read, the complemented remainder is equal to zero to validate the read code.

This relatively complex checking procedure requires considerable processing time. This time is added to that required by the sorting operations so that there is a reduction in available time for a central processing unit (CPU) of the system to carry out its primary data processing function. In one available system, the time available for the CPU to check the codes and process the data, between the time data are transferred to memory and the time a command is given to select a sorting compartment, is only 40 ms.

With a view to overcoming this drawback while retaining the advantages afforded by checking codes using a TCD, the processing system disclosed in U.S. patent application Ser. No. 834,982, filed Sept. 20, 1977, now abandoned, commonly assigned with the present application, was invented. The system for processing recorded data described in this application differs from the prior art mainly because the code checking operations of controlling document sorting and transferring checked data to be processed become the responsibility of the peripheral unit controller. The code checking operations are not performed by the CPU, which is thus relieved of these tasks and is able to devote itself exclusively to processing the data with no real-time restrictions associated with the system operation.

This advantageous way of organizing the system implies that the controller must first be provided with processing means which are sufficiently elaborate to perform, within a reasonable time, the complex calculations involved in TCD code checking. While one of the prior art uses of reading coded data has been in connection with magnetic indicia on checks, it is to be understood that other types of data can be so read and the invention is not limited to reading check coded data.

BRIEF DESCRIPTION OF THE INVENTION

The present invention removes the necessity of complex calculations by employing memory means and elementary processing means which enable the requisite calculations to be performed by a very simple procedure which can be carried out in a very short time, of the order of 500 microseconds in one embodiment. This result is achieved by placing "preprocessed data" in a table look-up memory and by employing an iterative procedure which makes use of the stored data in the memory.

An object of the invention is to provide a system for checking the validity of a machine read code. The code has a predetermined maximum length that is associated with a checking key. The checking key is derived by multiplying each of the elements of the code by a coefficient having a value dependent on the relative position in the code of the particular element. The multiplied elements are added together and the resulting sum is divided by a given number or modulus to derive a remainder. The complement of the remainder to the modulus is the checking key.

The code checking system includes a memory means which contains, for each modulus and/or combination of coefficients, an addressable dual-input look-up table. The look-up table is addressed by the value of each read element and the serial position of the read element, e.g. the first, second and third code elements having values of 3, 1 and 5 respectively address the first, second and third rows and the third, first and fifth columns of the table. At each address corresponding to a possible numerical value and relative position of a code element there is stored the remainder resulting from the operation (C) (V)/M, where: C equals the coefficient associated with the serial position of the element, V equals the value of the element, and M equals the modulus. An elementary processing means iteratively reads each code element and the remainder contained at the appropriate address in the table. The elementary processing means adds the remainder at the appropriate table address to the previous remainder and divides the total by the modulus to obtain a new remainder. The elementary processing means repeats these operations, with the checking key being taken as the initial remainder, until the end of the code is reached, and derives a final remainder which is equal to zero when the correct code is read.

The operations performed by the processing means involve only small numbers, the checking key and each remainder being by definition at least one unit less than the modulus so that the largest possible intermediate total which must be handled by the elementary processor has a relatively small number of bits, less than twice the modulus. Hence, there is an improved machine result because low bit capacity elementary processors can be employed.

Because the largest intermediate total is less than twice the modulus, the dividing operation is only performed when the intermediate total obtained by adding the remainder read to the previous remainder or to the key is greater than or equal to the modulus; the dividing operation is thus reduced to a simple subtraction from the modulus.

In addition, when the read code element value is zero, it is not necessary to consult the table and perform the processing operations since the previous remainder will not be altered, whereby the system may proceed directly to read the next code element and higher operating speed is attained.

Consequently, the processing means is reduced to a simple adding/subtracting register as well as first and second comparison means. The first comparison means determines whether the value of the read code element is zero. The second comparison means determines whether the register content is equal to or greater than the modulus or is zero at the end of reading. The simple structure of the processing means is reflected in the organization of the memory means. In the most usual case, numerical codes formed by decimal figures and a few reference symbols are read. In such an event, the size of each dual-input table is restricted to 10×16 useful addresses, to enable decimal codes consisting of 16 elements, including the checking key, to be identified and validated. In practice it is advantageous to use conventional tables in a 16×16 format, so each table contains 265 addresses.

If each address in such a table stores one octet (i.e., one 8 position binary code), the maximum value of the remainders, and thus of the corresponding modulus, is $2^8-1=255$. This provides a large range of moduli and/or "coefficient/position" combinations.

The system according to the invention employs very simple means while allowing elaborate code checking operations. There is thus no difficulty in building the system into a peripheral-unit controller which operates in real time to relieve the CPU of all tasks subsidiary to data processing.

Other features and advantages of the invention will be more clearly apparent from a perusal of the following description of some practical examples, which are illustrated by the tables and the accompanying drawing.

BRIEF DESCRIPTION OF THE DRAWINGS

FIGS. 2 through 5 are Tables I–IV, which indicate the decimal values of remainders corresponding to different checking procedures.

DETAILED DESCRIPTION OF THE TABLES AND FIGURES

Figure 1:
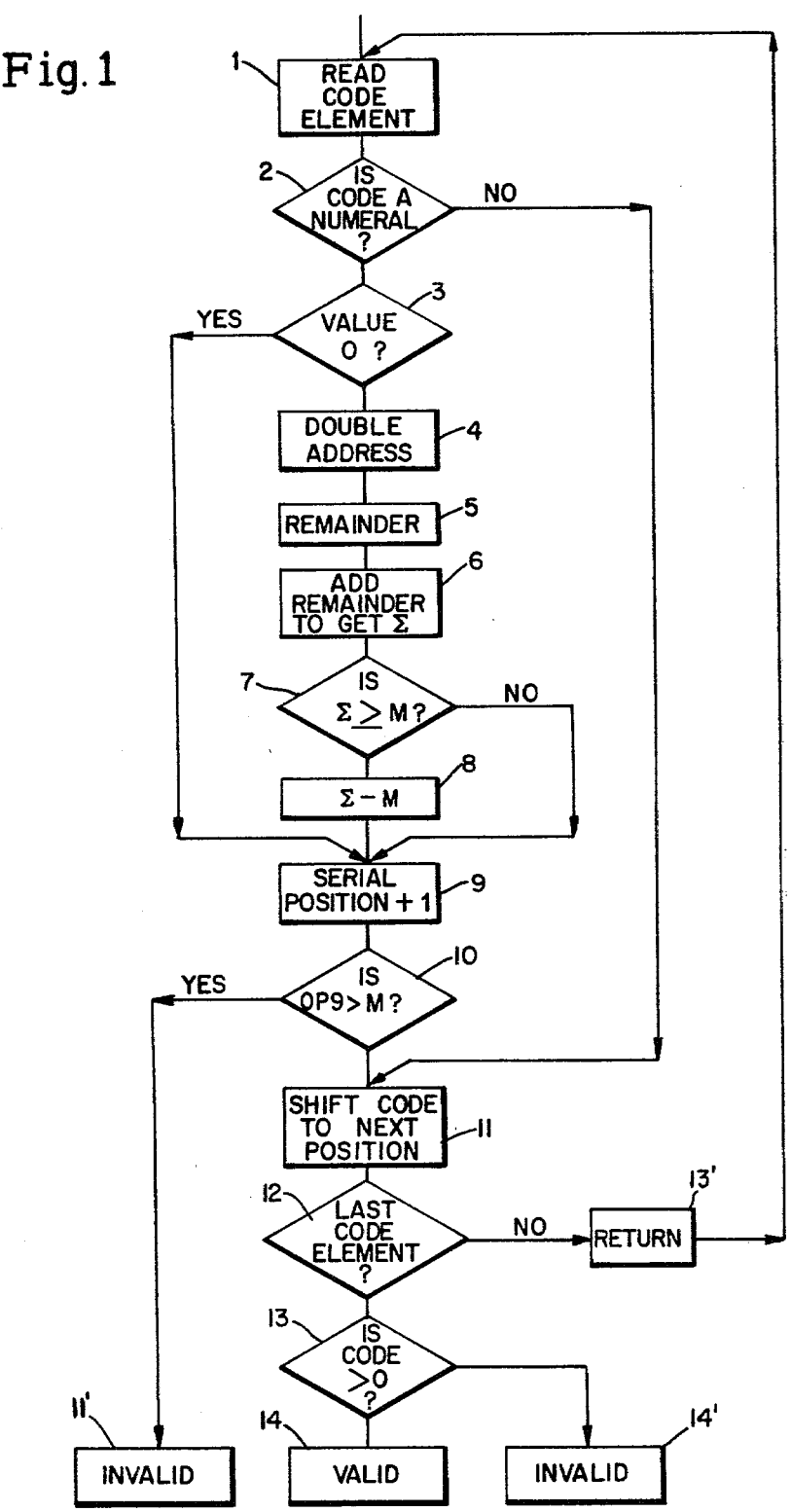
FIG. 1 is a flow diagram of the system operation.

As already stated, the conventional method of drawing-up a checking key of so-called "transposition check digit" or TCD kind involves in assigning an arbitrary coefficient to each position in a code of predetermined maximum length. The numerical value of the element which appears at this position in the code is multiplied by this coefficient, and the binomials so obtained are added together the resulting sum is then divided by a predetermined number or modulus. The complement to the modulus of the remainder after this division is used as the checking key, which is added at the end of the code or in any other locatable position. If the code, with its checking key, is correctly read, the same series of operations when applied to the key which is allotted the unity coefficient results in a final remainder of zero.

For the reasons mentioned, the present invention replaces this complex succession of checking operations, which involves the use of complex processing means, with a much simpler procedure which basically involves consulting a stored table of intermediate remainders.

A first example of the preparation and organisation of such a table is described with reference to Table 1 Table I concerns validating of decimal codes containing 16 positions (0 . . . 15). The 16 positions are alternately allotted the coefficients 1 and 2, depending on whether they have odd or even positions in the code; hence, the value(s) at a position in Table I is:

$$S = X0 + 2X1 + X3 + 2X4 + X5 + \ldots + X14 + 2X15$$

where X is the numerical value of the code elements which appears at the position specified, X0 is the value of a checking key (TCD) such that R(S/M)=0 for a modulus M, which in the present case is equal to 10.

Each box in the table represents a location of a memory which is identified by a double address consisting of a serial position of the element (0 to 15) and its decimal value i.e., column, position, (0 to 9). The table thus consists of sixteen operative rows and ten operative columns. The six additional columns indicate that, in practice, the memory has a conventional 16×16 format containing 256 locations, each of which receives one octet with the last location receiving the end-identifying octet FF.

Except in this latter case, each octet loaded into a memory location is equal to the binary value of the decimal number appearing in the appropriate box in the table. The decimal number in each box is in turn equal to the remainder after resulting from the modulus M=10 dividing the product of the given numerical value of a code element and the coefficients 2 and 1 respectively assigned to the odd and even serial position of this element.

Thus, as an example, in the case of the box which at the intersection of column 7 (value) and row 1 (serial position), this number is $4=R(7\times 2)/10$. In the first column, which is assigned numerical values of zero, and the unused columns which are assigned the same value, the intermediate remainders are obviously zero.

Entries in Table 2, correspond to the linear combination:

$$S = X0 + 2X1 + 3X2 + 4X3 + 5X4 + 6X5 \ldots + 10X9 + 11X10 \ldots$$

In Table II, the coefficients assigned to the successive serial positions follow a natural i.e., arithmetic, progression, with the modulus M being equal to 11. Thus, all the intermediate remainders in row 10 (coefficient 11) are zero.

Entries in Table 3, correspond to the linear combination:

$$S = X0 + 2X1 + 4X2 + 8X3 + \ldots + 512X9 \ldots$$

In Table III, the coefficients assigned to the successive serial positions follow a ratio-of-2 geometric progression, with the modulus M being equal to 11. Thus Table III, repeats itself from the tenth row, where the coefficient is $1024 = 11 \times 93 + 1$.

Entries in Table 4 correspond to the linear combination:

$$S = X0 + 10^1 X1 + 10^2 X2 + 10^3 X3 + 10^4 X4 + \ldots 10^N X N$$

The entries in Table IV reflect the true decimal value of each element of the code and have a modulus M of 17. In this case X0 is the first significant element of the code when read from right to left, and all the codes are selected in such a way that S is a whole number multiple of the modulus M. Table IV has the advantage of the checking key being unvarying and implicitly equal to zero throughout, so it may be omitted.

These non-limiting examples clearly show that the TCD checking keys under the conditions indicated, are capable of many variations and extensions of definition, and thus of any special application. Of course, the code elements, or at least some of them, could be letters or other symbols, which if need be are assigned an agreed numerical value equal to or higher than 10 to avoid confusion with the decimal figures.

Each intermediate remainder could also be recorded at the requisite location in the dual-input memory table as an octet of the BCD type which expresses two decimal figures separately. Alternatively the entries could comply with any other code compatible with the characteristics of the memory employed and of the associated processing circuits, instead of as an octet representing its decimal value transcribed into binary notation.

To simplify the processing circuits, the binary notation is preferable because all the arithmetic processing takes place in pure binary with decimal recording at the system input/output interfaces.

Finally, in all the cases which can be envisaged, the overall structure of the system remains the same and its method of operation would, in the main, conform to the flow chart shown in FIG. 1 of the drawing. In the flow chart are illustrated the operations of the system, without considering the corollary operations which occur upstream and downstream. Exemplary of the corollary operations are identifying and reading the codes, sorting of documents, and the use of validated data.

This being the case, operation 1 involves reading a predetermined element of the code. In operation 2 a decision is made whether or not the read element has a numerical value which can be handled; for example numerals can be handled but letters in alpha-numeric code cannot be handled. If the element can be handled, a comparison operation 3 determines if the element has a zero value. If the element value differs from zero, the double address of the remainder table is determined during operation 4. The column in the table is determined from the value of the code element read during operation 1. The row in the table is determined from the serial position of the read code element, as determined at operation 9 during the previous cycle. From the double address of the table, the appropriate remainder is read from the table at operation 5. The remainder determined during operation 5 is added at operation 6 to the previous remainder; if the first code element is being processed, the remainder is added to a predetermined number for the checking key. The total obtained during operation 6 is compared at operation 7 with the modulus.

If the sum of ($\Sigma$) is greater than or equal to modulus M, the modulus is subtracted from the sum during operation 8. After operation 8, the serial position for the read code element is incremented by one during operation 9 to enable the next code element to be handled. Incrementing operation 9 also directly follows comparison operations 3 and 7, if the numerical value of the code element is zero or if the total of the remainder read from memory and the previous remainder is less than the modulus.

Comparison operation 10 then determines whether the incremented position of the read element is still less than or equal to 15 (the serial position of the last element of a valid code). If the incremented serial position is greater than 15 the code reading operation is invalidated at 11' as an excessively long read code. Otherwise, operation 11 is executed, causing the stored code to shift by one position to enable the code element in the next serial position to be dealt with. Shift operation 11 follows operation 2 directly if the read element is not a numeral, i.e. if the read element is assigned a numerical value which cannot be handled. If the examination of the code has not been completed, branch 12 causes a return to the beginning of the process via command 13' so the next element of the code can be considered. The cycle is repeated until the end of the code is reached.

If operation 12 indicates that the last element of the code has been considered, operation 13 is performed. In operation 13, the final remainder is compared with zero. If operation 13 reveals that the final remainder is zero, the reading of this code is validated during operation 14; if operation 13 indicates that the final remainder is not equal to zero the code is signalled as invalid. during operation 14'.

The invention is not of course in any way limited to the examples of practical implementation described and illustrated or to the applications specifically mentioned but does in fact embrace all technical equivalents thereof which fall within the scope of the following claims.

I claim:

1. A method of checking the validity of coded signals adapted to represent alpha and numerical values, each of said coded signals consisting of (a) a series of code elements and (b) a checking key corresponding to a digit value of a first element of the coded signals, the coded signal being checked with a data processing means and a memory including an addressable dual input table having a number of rows at least equal to the maximum number of code elements of each coded signal and a number of columns at least equal to all the possible numerical values of a code element, columns and rows in said table being respectively addressed by the numerical value of a code element and by the relative position of said code element in the coded signal, the location defined by the intersection of the addressed column and said row containing an entry for a remainder, the remainder having a value equal to the numerical value of said code element multiplied by a coefficient assigned to the relative position divided by a given modulus, comprising the steps of, in the data processing means:

(I) reading a code element,
(II) checking each code element read during operation (I) to determine if the code element represents a numerical value, in response to the code element representing a numerical value:
 (A) determining if the read code element has a numerical value equal to zero, in response to the read code element not being equal to zero:
  (a) determining the address of the row and column of the corresponding remainder in the table, the column in the table being determined from the value of the read numerical code element, the row in the table being determined from the serial position of the read numerical code element in the series of numerical code elements,
  (b) reading the remainder from the table corresponding to the appropriate column and row,
  (c) determining if the first numerical code element in the series is being processed,
   (i) in response to there being a determination that the first numerical code element in the series is being processed adding the checking key to the remainder read during operation (b),
   (ii) in response to there being a determination that the first numerical code element in the series is not being processed adding the remainder read during operation (b) to the previous remainder;
  (d) determining whether the total obtained during operation (c) is greater than or equal to the given modulus,
   (i) only in response to the total obtained during operation (c) being not less than the modulus, subtracting the modulus from the total obtained during operation (c), (B) incrementing the series position of the read code element position in the sequence by a count of one in accordance with one of:
 (a) immediately after the operation (A) if operation (A) determines that the code element has a numerical value of zero, or
 (b) immediately after determining operation (A) (d) if operation (A) (d) determines that the total obtained during operation (A) (c) is less than the given modulus, or
 (c) after operation (A) (d) (i) if operation (A) (d) determines that the total obtained during operation (A) (d) is greater than or equal to the given modulus,
(C) determining whether the incremented series position from operation (B) is greater than the given modulus;
(III) shifting to the next numerical code element in the sequence:
 (A) immediately after operation (II) determining that the code is not for a numerical value, or
 (B) in response to operation (II) (C) determining that the incremented series position from operation (II) (B) is not greater than the given modulus;
(IV) determining whether the next numerical code in the sequence, as reached during shifting operation (III), is the last code element in the sequence,
 (A) in response to operation (IV) indicating that the code element reached during operation (III) is not the last code element in the sequence, returning to operation (I) and then repeating the sequence.

2. The method of claim 1 wherein operation (II) (B) is performed after operation (II) (A) without executing operations (II) (A) (a)–(II) (A) in response to operation (II) (A) determining that the read code element is equal to zero.

3. The method of claim 1 wherein operation (II) (B) is performed after operation (II) (A) (d) without performing subtracting operation (II) (A) (d) (i) in response to the total of the remainder read from the table during operation (II) (A) (d) being less than the modulus.

4. The method of claim 1 further comprising validating the coded signal as a numerical value in response to a remainder resulting from operation (II) (A) (d) (i) for the final element of the series being zero.

5. The method of claim 1 further including counting down the code position indicating which of the elements in the code exceeds a predetermined limit.

6. A method of claim 1 wherein the table in the memory contains at least 10×N address, where N is the maximum number of positions in a code, each of said code positions containing in coded form a remainder at most equal to the corresponding modulus.

7. The method of claim 6 wherein each table contains 256 addresses corresponding to (10+6) numerical values and 16 possible positions for a code element.

8. The method of claim 6 wherein each address in the table has at least one binary octet recorded at it.

9. The method of claim 8 wherein each octet is a direct binary transcription of the decimal value of the appropriate remainder.

* * * * *